United States Patent
Lee et al.

(10) Patent No.: US 9,496,741 B2
(45) Date of Patent: Nov. 15, 2016

(54) WIRELESS POWER TRANSMITTER AND METHOD OF CONTROLLING THE SAME

(71) Applicant: Samsung Electronics Co., Ltd., Gyeonggi-do (KR)

(72) Inventors: Kyung-Woo Lee, Seoul (KR); Hong-Kweun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 590 days.

(21) Appl. No.: 13/659,510

(22) Filed: Oct. 24, 2012

(65) Prior Publication Data

US 2013/0099734 A1    Apr. 25, 2013

Related U.S. Application Data

(60) Provisional application No. 61/550,691, filed on Oct. 24, 2011.

(51) Int. Cl.
| | |
|---|---|
| H02J 7/00 | (2006.01) |
| H02J 7/14 | (2006.01) |
| H02J 7/02 | (2016.01) |
| H02J 7/04 | (2006.01) |

(52) U.S. Cl.
CPC ............. H02J 7/007 (2013.01); H02J 7/025 (2013.01); *H02J 7/0004* (2013.01); *H02J 7/0072* (2013.01); *H02J 7/041* (2013.01)

(58) Field of Classification Search
USPC ....... 320/108, 137, 107, 106, 109, 115, 104, 320/113, 128, 134, 138, 139, 145, 162, 320/167; 307/104, 10.1, 149, 151, 45, 46, 307/66
See application file for complete search history.

(56) References Cited

U.S. PATENT DOCUMENTS

| | | | |
|---|---|---|---|
| 7,615,965 B2* | 11/2009 | Popescu-Stanesti et al. ............ 320/128 |
| 8,410,751 B2* | 4/2013 | Terao et al. .......... 320/108 |
| 2007/0228833 A1* | 10/2007 | Stevens et al. .......... 307/45 |
| 2008/0079392 A1* | 4/2008 | Baarman et al. ......... 320/108 |
| 2009/0033280 A1* | 2/2009 | Choi ............ H02J 7/025 320/108 |
| 2010/0201314 A1 | 8/2010 | Toncich et al. |
| 2010/0201513 A1* | 8/2010 | Vorenkamp et al. .... 340/539.13 |
| 2010/0315039 A1* | 12/2010 | Terao ............ H02J 7/025 320/108 |
| 2011/0278949 A1* | 11/2011 | Tsai ............ H02J 5/005 307/104 |
| 2011/0291489 A1* | 12/2011 | Tsai ............ H02J 17/00 307/104 |
| 2012/0212178 A1* | 8/2012 | Kim ............ 320/108 |

* cited by examiner

*Primary Examiner* — Alexis A Boateng
(74) *Attorney, Agent, or Firm* — The Farrell Law Firm, P.C.

(57) ABSTRACT

A method and apparatus for controlling wireless transmission to a wireless power receiver in a wireless power transmitter is provided. The method includes transmitting charging power to the wireless power receiver; detecting whether a predetermined power tracking triggering event for adjusting an applied transmission power according to power information of the wireless power receiver occurs; and adjusting, upon determining that the predetermined triggering event has occurred, the applied transmission power.

28 Claims, 11 Drawing Sheets

WIRELESS POWER TRANSMITTER AND METHOD OF CONTROLLING THE SAME

PRIORITY

This application claims priority under 35 U.S.C. §119(e) to a Provisional U.S. Patent Application filed in the United States Patent and Trademark Office on Oct. 24, 2011, and assigned Ser. No. 61/550,691, the entire content of which is incorporated herein by reference.

BACKGROUND OF THE INVENTION

1. Field of the Invention

The present invention relates generally to a wireless power transmitter and method of controlling the same, and more particularly, to a wireless power transmitter and a method for performing communication according to an adjusted transmission power.

2. Description of the Related Art

Mobile terminals, such as cell phones, Personal Digital Assistants (PDAs), etc., are powered by rechargeable batteries, and in order to recharge the batteries, the terminals supply electric energy to the batteries via separate charging devices. Typically, the charging device and the battery each having contacting terminals on their respective outer surfaces, and are electrically connected to each other via their contacting terminals.

However, when using such a contact charging method, the contacting terminals are susceptible to contamination by dirt, due to their exterior location, and such contamination may result in inadequate charging. Also, the rechargeable batteries may not be properly charged when the contacting terminals are exposed to moisture.

To address these problems, wireless charging or contactless charging technologies have recently been developed and applied to many different electronic devices.

A wireless charging technology using wireless power transmission and reception enables, for example, a battery of a cell phone to be automatically charged just by placing the cell phone on a charging pad without a need of a separate charging connector. Such technology is currently applied to wireless electric toothbrushes or wireless electric shaver. From the wireless charging technology, the electronic device may be benefited with enhanced waterproof and portable functions because of no need for a wired charging device. And in the coming era of electric vehicles, various relevant technologies are expected to be even more developed.

The wireless charging technology has an electromagnetic induction method using coils, a resonance method using resonance, and a Radio Frequency (RF)/micro wave radiation method that converts electric energy into microwaves for transmission.

Although wireless charging technology has thus far been dominated by the electromagnetic induction method, due to recent successful experiments in microwave-based wireless transmission from distances of a few tens of meters between devices, it is foreseeable that, in the near future, all electronic products may be wirelessly recharged anywhere and anytime.

A power transmission method based on the electromagnetic induction transfers power between primary and secondary coils. Movement of a magnet through a coil produces an induced current based on which a magnetic field is produced at the transmission end, and the change in the magnetic field at a receiving end induces a current to generate energy. This phenomenon is referred to as magnetic induction, and power transmission methods based on the magnetic induction provide superior energy transmission efficiency.

In a resonance method for wireless charging, a professor Soljacic of the Massachusetts Institute of Technology (MIT) suggested a system in which electricity is delivered wirelessly, even when the system is a few meters away from a charging device, using a resonance-based power transmission principle based on Coupled Mode Theory. The MIT team's wireless charging system is based on the resonance effect, a physical concept where a tuning fork being placed next to a wine glass causes the wine glass to ring with the same frequency. In the resonance method electromagnetic waves carrying the electric energy are resonated instead of sound. Resonant electric energy of electromagnetic waves is directly transferred only when there is a device having the same resonant frequency, and the non-used part of the energy is re-absorbed into the magnetic field rather than being dispersed in the air, and thus the resonant electric energy has not been found to be harmful to surrounding machines or bodies.

Studies on wireless charging methods are actively being performed, but standards for prioritizing wireless charging, searching for wireless power transmitters/receivers, selecting the communication frequency between the wireless power transmitter and receiver, adjusting the wireless power, selecting a matching circuit, distributing communication time for each wireless power receiver in a single charging cycle, etc. have not been suggested. In particular, there is a need for standardization for configurations related to wireless charging, and a need for procedures for providing an appropriate power for each wireless power transmission by wireless power transmitters.

SUMMARY OF THE INVENTION

Therefore, the present invention has been made to solve the above-mentioned problems occurring in the prior art, and provide the advantages and improvements as will be described below. Accordingly, the present invention provides a standard for general operations of a wireless transmitter/receiver, particularly a configuration and procedure of providing an appropriate power for each wireless power transmission in a wireless power transmitter.

In accordance with an aspect of the present invention, a method of controlling wireless transmission to a wireless power receiver in a wireless power transmitter is provided. The method includes transmitting charging power to the wireless power receiver; detecting whether a predetermined power tracking triggering event for adjusting an applied transmission power based on power information of the wireless power receiver occurs; and adjusting, upon determining that the predetermined triggering event has occurred, the applied transmission power.

In accordance with another aspect of the present invention, a wireless power transmitter for wirelessly transmitting power to a wireless power receiver is provided The wireless power transmitter includes a power transmitter for transmitting charging power to the wireless power receiver; a communication unit for receiving power information of the wireless power receiver; and a controller for detecting whether a predetermined power tracking triggering event for adjusting an applied transmission power according to the power information of the wireless power receiver occurs, and adjusting, upon determining that the predetermined triggering event has occurred, the applied transmission power.

BRIEF DESCRIPTION OF THE DRAWINGS

The above and other aspects, features and advantages of the present invention will become more apparent by describing in detail embodiments thereof with reference to the attached drawings in which.

DETAILED DESCRIPTION OF EMBODIMENTS OF THE PRESENT INVENTION

Figure 1:
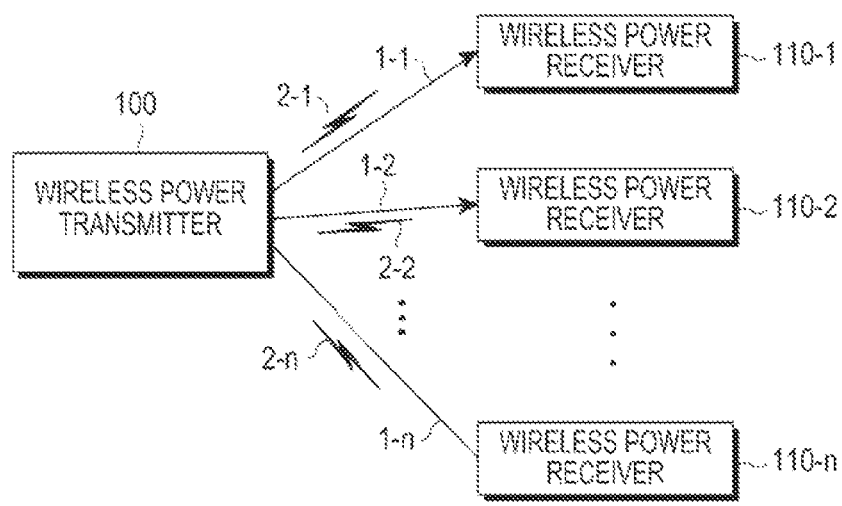
FIG. 1 is a conceptual diagram illustrating general operations of a wireless charging system according to an embodiment of the present invention.

Hereinafter, embodiments of the present invention are described with reference to the accompanying drawings. In the following description, the same elements may be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein may be omitted when such a description may obscure the subject matter of the present invention.

FIG. 1 is a conceptual diagram for explaining general operations of a wireless charging system according to an embodiment of the present invention.

Referring to FIG. 1, the wireless charging system includes a wireless power transmitter 100 and at least one wireless power receiver 110-1, 110-2, ..., 110-n.

The wireless power transmitter 100 wirelessly transmits respective power 1-1, 1-2, ..., 1-n to the wireless power receivers 110-1, 110-2, ..., 110-n. Specifically, the wireless power transmitter 100 may wirelessly transmit power 1-1, 1-2, ..., 1-n only to wireless power receivers authenticated via a predetermined authentication procedure.

The wireless power transmitter 100 establishes an electrical connection with the at least one wireless power receiver from among the wireless power receivers 110-1, 110-2, ..., 110-n. For example, the wireless power transmitter 100 may transmit the wireless power to the wireless power receivers 110-1, 110-2, ..., 110-n in an electromagnetic waveform.

The wireless power transmitter 100 may also perform bidirectional communication with the wireless power receivers 110-1, 110-2, ..., 110-n. The wireless power transmitter 100 and the wireless power receivers 110-1, 110-2, ..., 110-n process and transmit/receive packets 201, 202, ..., 2-n consisting of certain frames, which are described in more detail herein below.

The wireless power receivers may be implemented in mobile communication terminals, Personal Digital Assistants (PDAs), Portable Multimedia Players (PMPs), smartphones, etc.

The wireless power transmitter 100 wirelessly provides power to the plurality of the wireless power receivers 110-1, 110-2, ..., 110-n. For example, the wireless power transmitter 100 may transmit power to the plurality of the wireless power receivers 110-1, 110-2, ..., 110-n based on a resonance method. When the resonance method is adopted by the wireless power transmitter 100, a distance between the wireless power transmitter 100 and the plurality of the wireless power receivers 110-1, 110-2, ..., 110-n may be limited to a maximum of 30 m. However, when a electromagnetic induction method is adopted by the wireless power transmitter 100, a distance between the wireless power transmitter 100 and the plurality of the wireless power receivers 110-1, 110-2, ..., 110-n may be limited to a maximum of 10 cm.

The wireless power receivers 110-1, 110-2, ..., 110-n charge a battery therein by receiving wireless power from the wireless power transmitter 100. The wireless power receivers 110-1, 110-2, ..., 110-n may also transmit, to the wireless power transmitter 100, a signal for requesting wireless power transmission, information necessary for wireless power reception, information indicating states of the wireless power receivers, and/or control information of the wireless power transmitter, which are described in more detail herein below.

The wireless power receivers 110-1, 110-2, and 110-n also each transmit a message indicating a respective charging state to the wireless power transmitter 100.

The wireless power transmitter 100 includes a display unit, and displays the respective states of each of the wireless power receivers 110-1, 110-2, ..., 110-n based on the respective messages received from the wireless power receivers 110-1, 110-2, ..., 110-n. The wireless power transmitter 100 also displays an estimate of the time until completion of charging the respective wireless power receivers 110-1, 110-2, ..., 110-n.

The wireless power transmitter 100 also transmits a control signal to each wireless power receiver 110-1, 110-2, ..., 110-n to disable its wireless charging function. When receiving the disable signal from the wireless power transmitter 100, the receiving wireless power receivers disable their own wireless charging functions.

Figure 2A:
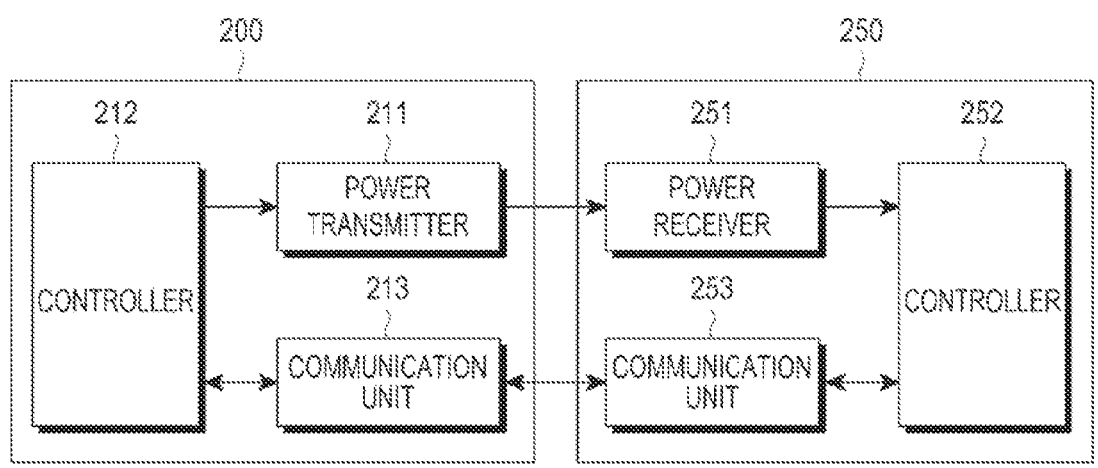
FIG. 2A is a block diagram illustrating a wireless power transmitter and a wireless power receiver according to an embodiment of the present invention.

FIG. 2A is a block diagram illustrating a wireless power transmitter and a wireless power receiver according to an embodiment of the present invention.

Referring to FIG. 2A, the wireless power transmitter 200 includes a power transmitter 211, a controller 211, and a communication unit 213. The wireless power receiver 250 includes a power receiver 251, a controller 252, and a communication unit 253.

The power transmitter 211 provides power requested by the wireless power transmitter 200, and wirelessly transmits the requested power to the wireless power receiver 250. Here, the power transmitter 211 supplies the power in an Alternate Current (AC) waveform, or may convert the power in a Direct Current (DC) form into the AC waveform for supply by using an inverter. The power transmitter 211 may also be implemented in the form of a built-in battery or a power receiving interface for receiving power from an outside source and supplying the received power to other components in the wireless power transmitter 200. The power transmitter 211 is not limited to the above-described examples, but may also be implemented in any other such device that provides power in an AC waveform in accordance with embodiments of the present invention.

In addition, the power transmitter 211 provides the AC waveform as electromagnetic waves to the wireless power receiver 250. The power transmitter 211 may also include a loop coil to transmit or receive the electromagnetic waves. When the power transmitter 211 includes a loop coil, an inductance L of the loop coil may be variable. The wireless transmitter 211 is not limited to the above-described examples, but may be implemented in any device for transmit or receive electromagnetic waves in accordance with embodiments of the present invention.

The controller 212 controls general operations of the wireless power transmitter 200. The controller 212 controls the general operations of the wireless power transmitter 200 by using a control algorithm, a program, or an application read from a storage (not shown). The controller 212 may be implemented in the form of a Central Processing Unit (CPU), a microprocessor, or a mini-computer. Detailed operations of the controller 212 are described herein below.

The communication unit 213 communicates with the wireless power receiver 250 through a predetermined communication method. The communication unit 213 may communicate with the communication unit 253 of the wireless power receiver 250 based on Near Field Communication (NFC), Zigbee communication, infrared communication, ultraviolet communication, etc. According to embodiments of the present invention, the communication unit 213 may use the Institute of Electrical and Electronics Engineers (IEEE) 802.15.4 Zigbee communication method. Furthermore, the communication unit 213 may use a Carrier Sense Multiple Access with Collision Avoidance (CSMA/CA) algorithm. Configurations for selecting a frequency and channel for use in the communication unit 213 are discussed in detail herein below. The foregoing communication methods used by the communication unit 213 are just examples, and embodiments of the present invention are not limited thereto.

The communication unit 213 transmits a signal including information regarding the wireless power transmitter 200. Here, the communication unit 213 may unicast, multicast, or broadcast the signal. Table 1 shows a data structure of the signal transmitted from the wireless power transmitter 200. The wireless power transmitter 200 may transmit the signal having the following frame structure of Table 1 in every predetermined cycle, such that the signal is dubbed as a Notice signal.

TABLE 1

| frame type | protocol version | sequence number | network ID | RX to Report (schedule mask) | Reserved | Number of Rx |
|---|---|---|---|---|---|---|
| Notice | 4 bit | 1 Byte | 1 Byte | 1 Byte | 5 bit | 3 bit |

The frame type field indicates a type of the signal, herein indicating that the signal is a Notice signal. The protocol version field indicates a type of a protocol of the communication method, which may be assigned 4 bits, for example. The sequence number field indicates a sequential order of the corresponding signal, which may be assigned 1 byte, for example. For example, the sequence number may be incremented by 1 for each signal transmission or reception. The network IDentifiier (ID) field indicates a network identifier of the wireless power transmitter 200, which may be assigned 1 byte, for example. The Reception (Rx) to Report (schedule mask) field, which indicates which wireless power receiver is intended to report to the wireless power transmitter 200, may be assigned 1 byte, for example. Table 2 shows the Rx to Report (schedule mask) field, according to an embodiment of the present invention.

TABLE 2

| RX to Report (schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

Rx1 to Rx8 correspond to the wireless power receivers 1 to 8. In the Rx to Report (schedule mask) field shown in Table 2, wireless power receivers corresponding to '1' may perform the reporting operations.

The Reserved field, which is reserved for later use, may be assigned 5 bytes, for example. The Number of Rx field, which indicates the number of wireless power receivers around the wireless power transmitter 200, may be assigned 3 bits, for example.

A signal in a form of the frame according to Table 1 may be implemented in a form to be assigned to Wireless Power Transmit (WPT) of a data structure in the IEEE 802.15.4 format. Table 3 shows the data structure in the IEEE 802.15.4 format.

TABLE 3

| Preamble | SFD | Frame Length | WPT | CRC16 |
|---|---|---|---|---|

As shown in Table 3, the data structure in the IEEE 802.15.4 format may include a Preamble, Start Frame Delimiter (SFD), Frame Length, WPT, Cyclic Redundancy Code (CRC) 16 fields, and the data structure of Table 1 may correspond to the WPT field.

The communication unit 213 receives power information from the wireless power receiver 250. The power information includes at least one of a capacity of the wireless power receiver 250, a remaining battery indicator, information indicating a frequency of charging, battery consumption, battery capacity, a battery charge/consumption ratio, for example. The communication unit 213 transmits a charge function control signal to control a charging function of the wireless power receiver 250. The charge function control signal is used to enable or disable the charging function by controlling the power receiver 251 of the wireless power receiver 250.

The communication unit 213 may receive signals, not only from the wireless power receiver 250, but also different wireless power transmitters (not shown). For example, the communication unit 213 may receive, from the different wireless power transmitter, a Notice signal having the frame of the foregoing Table 1.

In the wireless power transmitter 200 of FIG. 2A, the power transmitter 211 and the communication unit 213 are separate and appear use out-band communications, but embodiments of the present invention are not limited thereto. The power transmitter 211 and the communication unit 213 may be integrated in a single hardware device, and thus the wireless power transmitter 200 may use in-band communications in accordance with embodiments of the present invention.

The wireless power transmitter 200 and the wireless power receiver 250 communicate various signals with each other, and accordingly subscription of the wireless power receiver 250 to a wireless power network hosted by the wireless power transmitter 200 and charging process through wireless power transmission and reception may be performed, which is described in detail herein below.

Figure 2B:
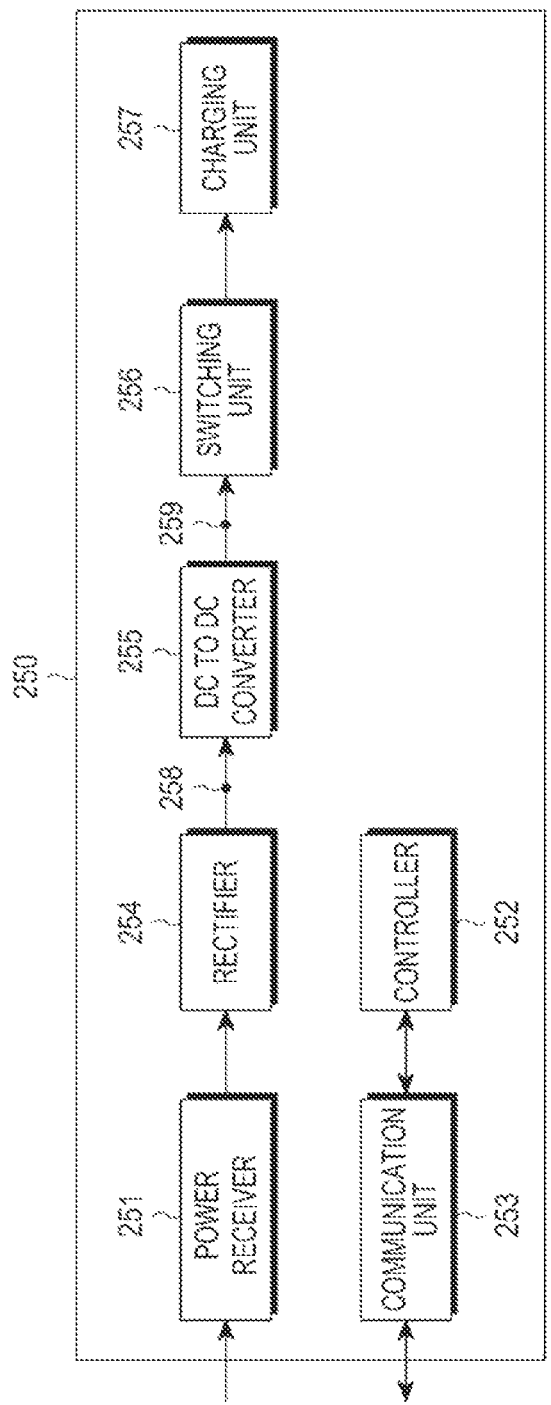
FIG. 2B is a block diagram illustrating wireless power receiver according to an embodiment of the present invention.

FIG. 2B is a block diagram illustrating a wireless power receiver according to an embodiment of the present invention.

Referring to FIG. 2B, a wireless power receiver 250 includes a power receiver 251, a controller 252, a communication unit 253, a rectifier 254, a DC to DC converter 255, a switching unit 256, and a charging unit 257.

The power receiver 251, the controller 252 and the communication unit 253, operate in a manner similar to that described above with respect to corresponding components of FIG. 2A, and accordingly a further description of these components is omitted for clarity and conciseness. The rectifier 254 rectifies wireless power received by the power receiver 251 into a Direct Current (DC) format and may be implemented with bridge diodes, for example. The DC to DC converter 255 converts the rectified power to have a predetermined level. For example, the DC to DC converter 255 may convert the rectified voltage to 5V at its output end 259. However, minimum and maximum values of a voltage to be applied to the front end (input end) of the DC to DC converter 255 may be preset, and the values may be recorded in Input Voltage MIN and Input Voltage MAX fields of a request join signal, respectively, which are discussed in detail herein below. Rated voltage and rated current at the output end 259 of the DC to DC converter 255 may also be recorded in Typical Output Voltage and Typical Output Current fields of the Request join signal.

The switching unit 256 connects the DC to DC converter 255 to the charging unit 257. The switching unit 256 keeps an ON or OFF state under control of the controller 252. The charging unit 257 stores the converted power input from the DC to DC converter 255 when the switching unit 256 is in the ON state.

Figure 3:
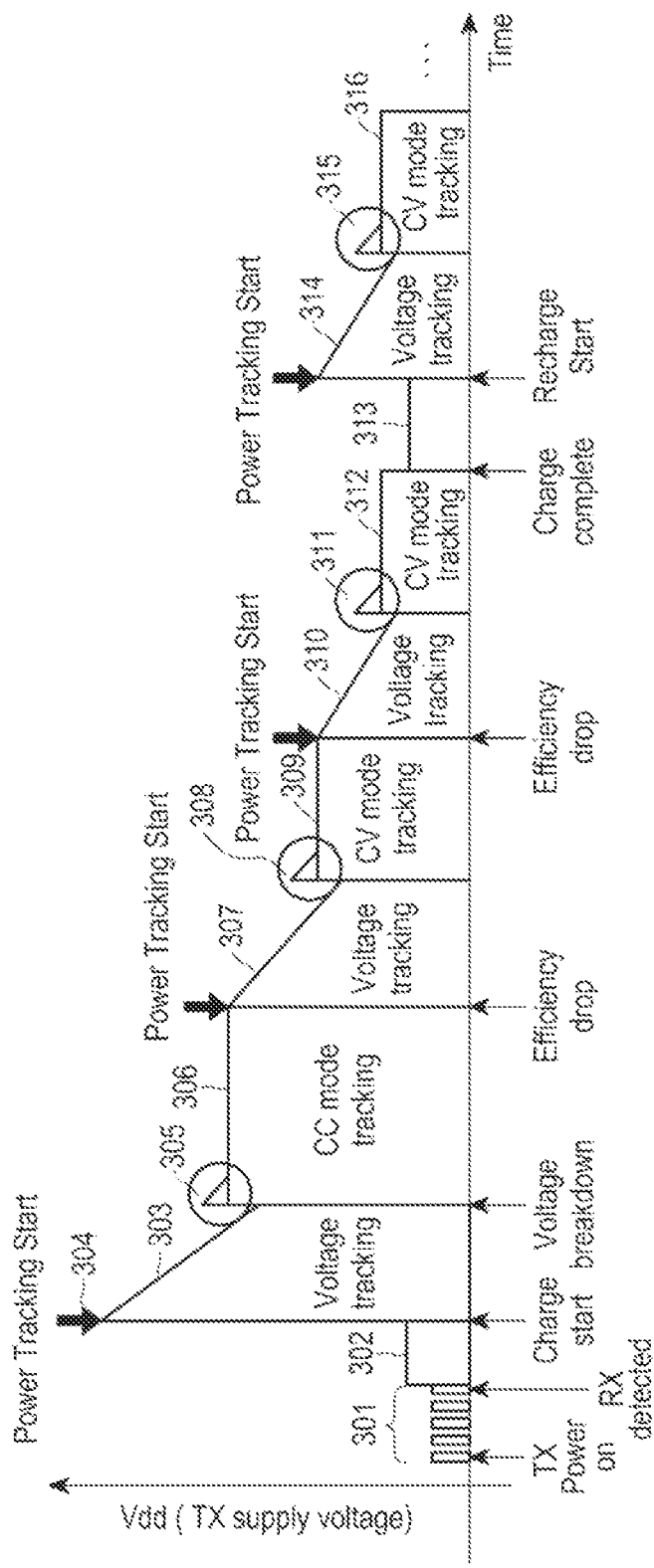
FIG. 3 is a conceptual diagram illustrating adjustment of power in a wireless power transmitter according to an embodiment of the present invention.

FIG. 3 is a conceptual diagram illustrating adjustment of power in the wireless power transmitter according to an embodiment of the present invention.

Referring to FIG. 3, the wireless power transmitter applies detection power 301 to be used for detecting an object disposed in proximity of the wireless power transmitter.

The wireless power transmitter keeps the detecting state in which to transmit the detection power Pdet 301, for each predetermined cycle tdet_per during an effective duration tdet. The detection power Pdet and the effective duration tdet are determined based on the minimum power and time required for the wireless power transmitter to detect whether there is a candidate device for wireless charging within an effective range by detecting a load change of the power transmitter (i.e., a load change of the resonator). Since the detection of the candidate device (i.e., the detection of a metal object) only requires detection of the load change of the resonator, the wireless power transmitter minimizes consumption of the detection power in the detection state by periodically generating a sine wave having a voltage amplitude as high as sufficient for detecting the load of the resonator for a short time as long as required for detecting the load. The detection state is maintained until a new device is detected during the effective duration tdet.

For example, when a wireless power receiver is located adjacent to the wireless power transmitter, the wireless power transmitter detects the load change and determines that an object is located around itself.

The wireless power transmitter thus determines, based on the detection of the load change, that a wireless power receiver is located nearby. In this case, the wireless power transmitter may transmit a driving power 302 to the wireless power receiver for communication.

Here, the driving power 302 may be used to drive the controller or a Micro Controller Unit (MCU) of the wireless power receiver. The driving power 302 may be set to be in a range greater than the absolute value of the detection power and less than the absolute value of the charging power.

The wireless power transmitter determines whether to subscribe the detected wireless power receiver to the wireless power network controlled by the wireless power transmitter. The wireless power transmitter transmits the charging power to the subscribed wireless power receiver. The wireless power transmitter transmits a command signal to instruct the wireless power receiver to start charging while increasing the applied power.

The wireless power transmitter may apply a power having a voltage larger than the voltage 306 of power required by the wireless power receiver. For example, when the voltage of the power required by the wireless power receiver is represented by 306, the wireless power transmitter applies power having a voltage represented by 303 that is greater than that represented by 306.

After applying the power, the wireless power transmitter linearly decrease the voltage of the applied power, which as indicated by reference numeral 304. The wireless power transmitter receives power information from the wireless power receiver even while decreasing the voltage of the applied power 304. The power information includes information about voltage or current at the input end or output end of the DC to DC converter of the wireless power receiver.

The wireless power transmitter reduces the voltage of the applied power until the voltage at the input end of the DC to DC converter of the wireless power receiver becomes less than a threshold. Otherwise, the wireless power transmitter may reduce the voltage of the applied power until the voltage at the output end of the DC to DC converter of the wireless power receiver is below a threshold.

The foregoing process of setting up the voltage of the wireless power to be higher than required and setting up again to the required voltage by reduction is called power tracking.

The wireless power transmitter increases the voltage of the applied power, if the voltage at the input end or output end of the DC to DC converter of the wireless power receiver falls below the threshold value, as indicated by voltage 305. The wireless power transmitter may increase the voltage 305 to a voltage greater than the voltage of the power required in a Constant Current (CC) mode, as indicated by voltage 306. The reason for increasing the voltage is to address the hysteresis in cases of voltage rise and drop. However, the wireless power transmitter adjusts the voltage 305 back into the voltage 306 required in the CC mode and transmits the result of the adjustment.

Figure 4:
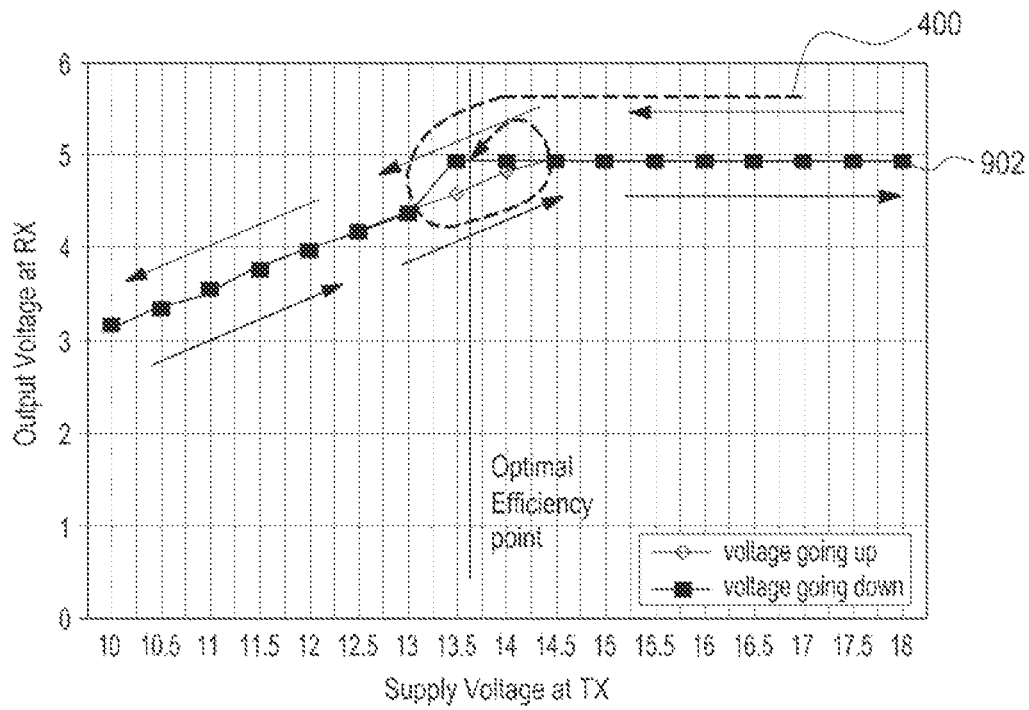
FIG. 4 is a graph for illustrating hysteresis in cases of voltage rise and drop.

FIG. 4 is a graph illustrating hysteresis in cases of the voltage rise and drop according to an embodiment of the present invention.

Referring to FIG. 4, different characteristics are shown for the cases of voltage 902 drop and voltage 902 rise, which causes hysteresis 400. To deal with the hysteresis, the wireless power transmitter increases a voltage 305 to a voltage greater than the voltage 306 of the power required in the CC mode.

The wireless power transmitter performs initial charging in the CC mode. As the wireless power receiver approaches nearer to a fully charged state, its impedance increases. Accordingly, the entire efficiency of wireless power transmission and reception decreases.

When detecting the decrease in the efficiency, the wireless power transmitter may decrease the voltage 307 of the applied power. For example, the wireless power transmitter may perform impedance matching so as to control the efficiency not to be degraded. The wireless power transmitter increases the voltage of the applied power, if the voltage at the input end or output end of the DC to DC converter of the wireless power receiver becomes less than the threshold value, which is represented by 308.

The wireless power transmitter increases, at 308, the voltage of the applied power to a voltage greater than the voltage 309 in the Constant Voltage (CV) mode. Then, the wireless power transmitter reduces the voltage 308 to the voltage 309 required in the CC mode and maintains the result.

As the wireless transmission efficiency decreases, the wireless power transmitter performs the power tracking again. The wireless power transmitter reduces the voltage of the applied power, which is represented by 310. The wireless power transmitter decreases the voltage of the applied power until the voltage 310 at the input end or output end of the DC to DC converter of the wireless power receiver falls below a predetermined threshold. The wireless power transmitter may perform the impedance matching based on the power information of the wireless power receiver. Through the impedance matching, the wireless power transmitter prevents the degradation of the efficiency.

The wireless power transmitter increases the voltage of the applied power when the voltage 311 at the input end or output end of the DC to DC converter of the wireless power receiver falls below the predetermined threshold. Then, the wireless power transmitter reduces the increased voltage 311 to a voltage 312 of the power required in the CV mode. Upon completion of charging the wireless power receiver, the wireless power transmitter transmits the driving power 313 to the wireless power receiver for communication.

However, when recharging the wireless power receiver, the wireless power transmitter performs the power tracking. The wireless power transmitter increases and then decreases the applied power 314. The wireless power transmitter increases the voltage of the applied power when the voltage 315 at the input end or output end of the DC to DC converter of the wireless power receiver falls below the threshold. Then, the wireless power transmitter reduces the increased voltage 315 to a voltage 316 of the power required in the CV mode.

As discussed above, when the wireless power transmitter as sufficient power for charging the wireless power receiver, the wireless power transmitter transmits a command signal including a command to instruct the wireless power receiver to start charging. Prior to transmitting the command signal, the wireless power transmitter may increase power to be a little higher than a required amount of power. Upon reception of the command signal, the wireless power receiver performs charging by controlling the switching unit 256 between the DC to DC converter 255 and the charging unit 257 to be in the ON state.

The wireless power transmitter calculates the wireless transmission efficiency based on the power information of the wireless power receiver and detected information at a sensor port of the wireless power transmitter. When the wireless transmission efficiency is less than a predetermined threshold (Eff threshold), the wireless power transmitter performs the impedance matching to obtain a maximum wireless transmission efficiency.

In the impedance matching, the wireless power transmitter performs the power tracking. To obtain the optimal efficiency, the wireless power transmitter decrements the voltage to be applied to an amplifier therein step by step. In addition, the wireless power transmitter decreases the voltage of the applied power until the voltage at the input end or output end of the DC to DC converter of the wireless power receiver falls below the threshold.

As described above, the wireless power transmitter may perform the power tracking in the following cases:

i) when a new device, to which the wireless power transmitter transmits the command signal to start charging, is registered and ready to be charged;

ii) when a wireless power receiver is rearranged or withdrawn, thus the load change being detected;

iii) when the wireless transmission efficiency is less than a predetermined threshold; or iv) when the voltage at the input end or output end of the DC to DC converter of the wireless power receiver is less than a predetermined threshold.

According to the foregoing procedure, the wireless power transmitter may reduce the power consumption by efficiently adjusting the applied power.

Figure 5A:
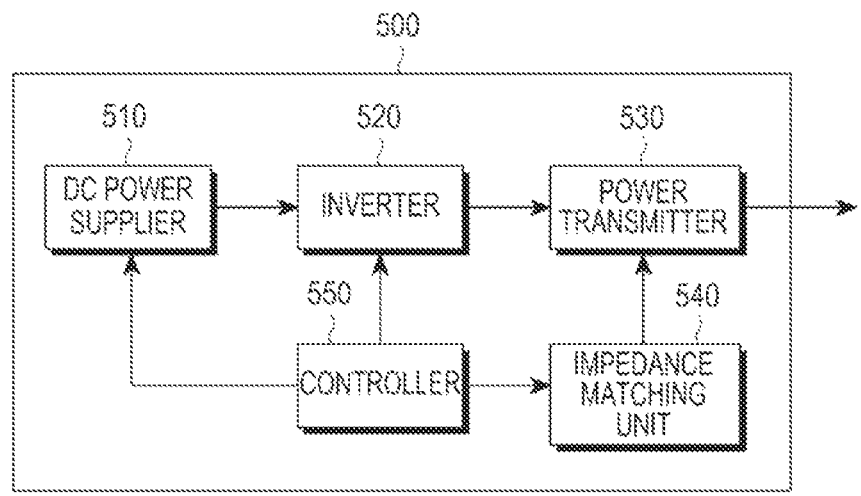
FIG. 5A is a block diagram illustrating a wireless power transmitter according to an embodiment of the present invention.

FIG. 5A is a block diagram illustrating a wireless power transmitter according to an embodiment of the present invention.

Referring to FIG. 5A, a wireless power transmitter 500 includes a power supplier 510, an inverter 520, a power transmitter 530, an impedance matching unit 540, and a controller 550.

The power supplier 510 supplies power for operating and charging the wireless power transmitter 500. The power supplier 510 includes an amplifier (not shown) for amplifying input power with a predetermined gain and outputting the result.

The inverter 520 inverts the input power into an AC waveform and outputs the result. The power transmitter 530 wirelessly transmits the power in the AC waveform.

The impedance matching unit 540 maintains an optimal wireless power efficiency by performing the impedance matching. The controller 550 calculates the wireless transmission efficiency based on power state information of the wireless power receiver and detected information at a sensor port of the wireless power transmitter. If the efficiency is less than the predetermined threshold (Eff threshold), the controller 550 controls the impedance matching unit 540 to perform impedance matching to obtain an optimal efficiency.

In the impedance matching, the controller 550 performs the power tracking. To obtain the optimal efficiency, the power supplier 510 decrements the voltage applied to the amplifier therein, step by step. The controller 550 also decreases the voltage of the applied power until the voltage at the input end or output end of the DC to DC converter of the wireless power receiver falls below the predetermined threshold.

Figure 5B:
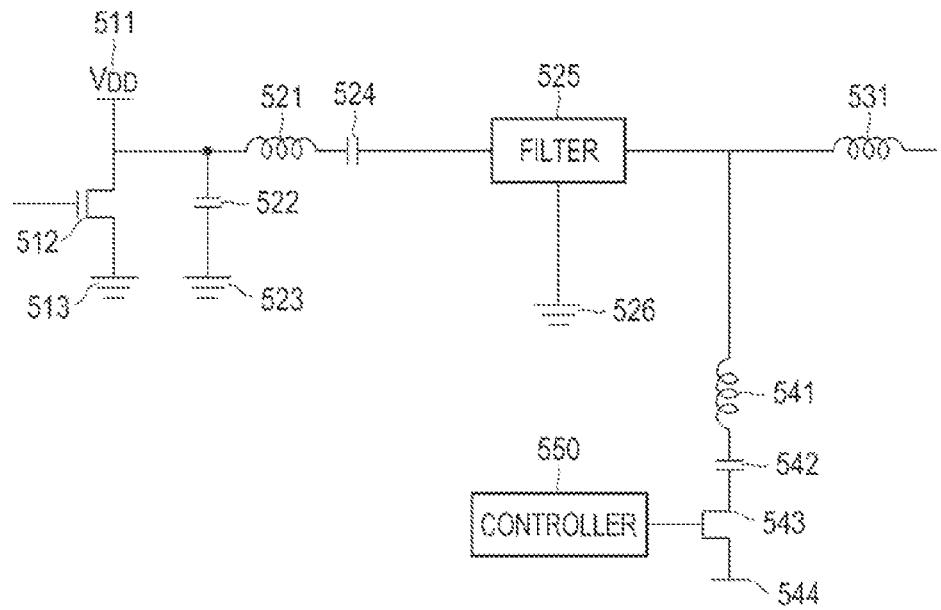
FIG. 5B is a circuit diagram illustrating a wireless power transmitter according to an embodiment of the present invention.

FIG. 5B is a circuit diagram illustrating a wireless power transmitter according to an embodiment of the present invention.

Referring to FIG. 5B, the wireless power transmitter includes a power supplier 511 to supply an applied voltage $V_{DD}$. The power supplier 511 is connected to a Field Effect Transistor (FET) device 512, an end of a coil 521, and an end of a capacitor 522. The other end of the FET device 512 is connected to a grounded 513. The other end of the capacitor 522 is connected to a ground 523. The other end of the coil 521 is connected to an end of the capacitor 524, the other end of which is connected to a filter 525. The filter 525 is connected to grounded 526. The other end of the filter 525 is connected to an end of a coil 531 and an end of another coil 541. The other end of the coil 541 is connected to an end of a capacitor 542, the other end of which is connected to an FET device 543. The FET device 543 is connected to the controller 550 and a ground 544.

Here, inductance of the coil 541 and capacitance of the capacitor 542 vary under control of the controller 550. The controller 550 changes the inductance of the coil 541 and the capacitance of the capacitor 542 to optimize the efficiency based on the power information received from the wireless power receiver. Specifically, the controller 550 performs power tracking when detecting degradation of the wireless power efficiency, and changes the inductance of the coil 541 and the capacitance of the capacitor 542 to maintain the optimal efficiency during power tracking.

Figure 5C:
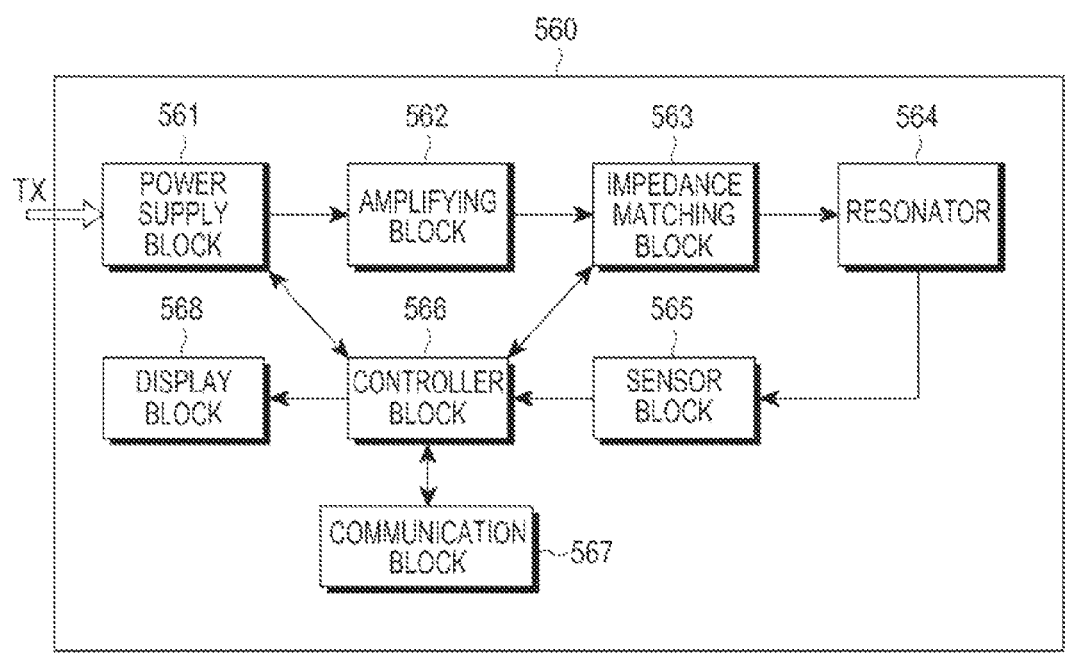
FIG. 5C is a diagram illustrating hardware structure of a wireless power transmitter according to an embodiment of the present invention.

FIG. 5C is a diagram illustrating a hardware structure of a wireless power transmitter according to an embodiment of the present invention.

Referring to FIG. 5C, a wireless power transmitter includes a power supply block 561, an amplifying block 562, an impedance matching block 563, a resonator 564, a sensor block 565, a control block, a communication block 567, and a display block 568.

The power supply block 561 supplies power required for operations of the wireless power transmitter 560 and power to be transmitted to the wireless power receiver. The power supply block 561 changes the amount and waveform of the power under control of the control block 566 and outputs the results. The power supply block 561 may be implemented with a conventional power supply, but other power supplied my be used in accordance with embodiments of the present invention.

The amplifying block 562 amplifies the power input from the power supply block 561 with a predetermined gain and outputs the result. The amplifying block 562 may be implemented with a class-E Operational AMPlifier (OP amp), for example, but any device capable of amplification with a predetermined gain for output may be used in accordance with embodiments of the present invention.

The impedance matching block 563 performs impedance matching to optimize the wireless power transmission efficiency. The impedance matching block 563 includes at least one variable coil and at least one variable capacitor. The impedance matching block 563 also includes at least one coil and at least one capacitor.

The resonator 564 transmits power to a resonator of the wireless power receiver by power resonance.

The sensor block 565 senses proximity of the wireless power receiver based on various determination measures, such as infrared, ultraviolet, RF signals, weight, etc.

The control block 566 controls general operations of the wireless power transmitter. In particular, the control block 566 analyzes the signal received by the communication block 567 from the wireless power receiver and generate a signal to transmit to the wireless power receiver. The control block 566 also ensures maintenance of the optimal wireless power transmission efficiency by controlling the impedance matching block 563. The control block 566 adjusts the voltage of the power applied to the amplifying block 562. For example, in the power tracking process, the wireless power transmitter decrements the voltage applied to the amplifying block 562 step by step. The controller 566 decreases the voltage applied to the amplifying block 562 based on the power information input from the wireless power receiver until a voltage at the input end or output end of the DC to DC converter of the wireless power receiver falls below the predetermined threshold.

The display block 568 notifies the user of a current charging state of the wireless power receiver or error messages.

Figure 5D:
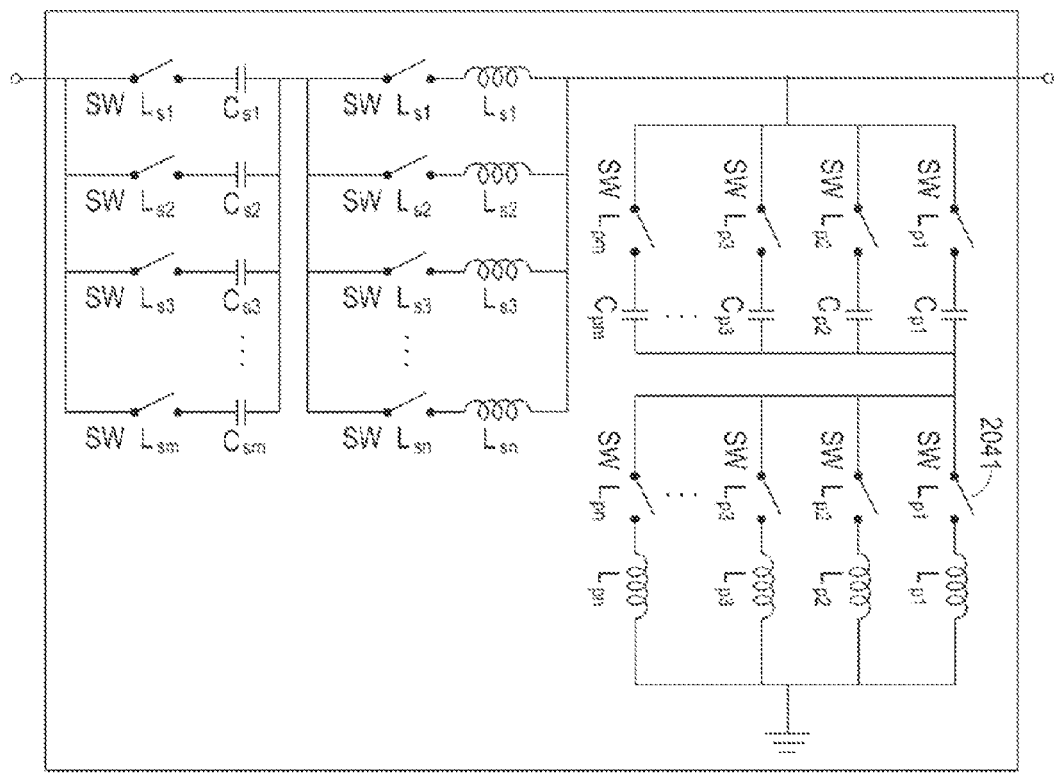
FIG. 5D is a circuit diagram illustrating an impedance matching block according to an embodiment of the present invention.

FIG. 5D is a circuit diagram illustrating a impedance matching block according to an embodiment of the present invention.

Referring to FIG. 5D, the impedance matching block includes a plurality of switches, capacitors, and coils. The impedance matching block includes a plurality of switch-capacitor pairs connected in parallel (SW $L_{S1}$-$C_{S1}$ to SW $L_{Sm}$-$C_{Sm}$), each switch-capacitor pair having a switch and a capacitor connected in series. The impedance matching block includes a plurality of switch-coil pairs connected in parallel (SW $L_{S1}$-$L_{S1}$ to SW $L_{Sm}$-$L_{Sm}$), each switch-coil pair having a switch and a coil connected in series, and the plurality of switch-coil pairs being connected to the plurality of switch-capacitor pairs in series. Furthermore, the impedance matching block includes another plurality of switch-capacitor pairs connected in parallel (SW $L_{p1}$-$C_{p1}$ to SW $L_{pm}$-$C_{pm}$), each switch-capacitor pair having a switch and a capacitor connected in series, and the another plurality of switch-capacitor pairs being connected to the plurality of switch-coil pairs in parallel. In addition, the impedance matching block includes another plurality of switch-coil pairs connected in parallel (SW $L_{p1}$-$L_{p1}$ to SW $L_{pm}$-$L_{pm}$), each switch-coil pair having a switch and a coil connected in series, and the another plurality of switch-coil pairs being connected to the another plurality of switch-capacitor pairs in series.

The control block 566 sets the plurality of switches of the impedance matching block into ON or OFF states, thereby creating different impedance. Such different impedance created by the impedance matching block contributes to maintaining an optimal wireless power transmission efficiency.

Figure 6A:
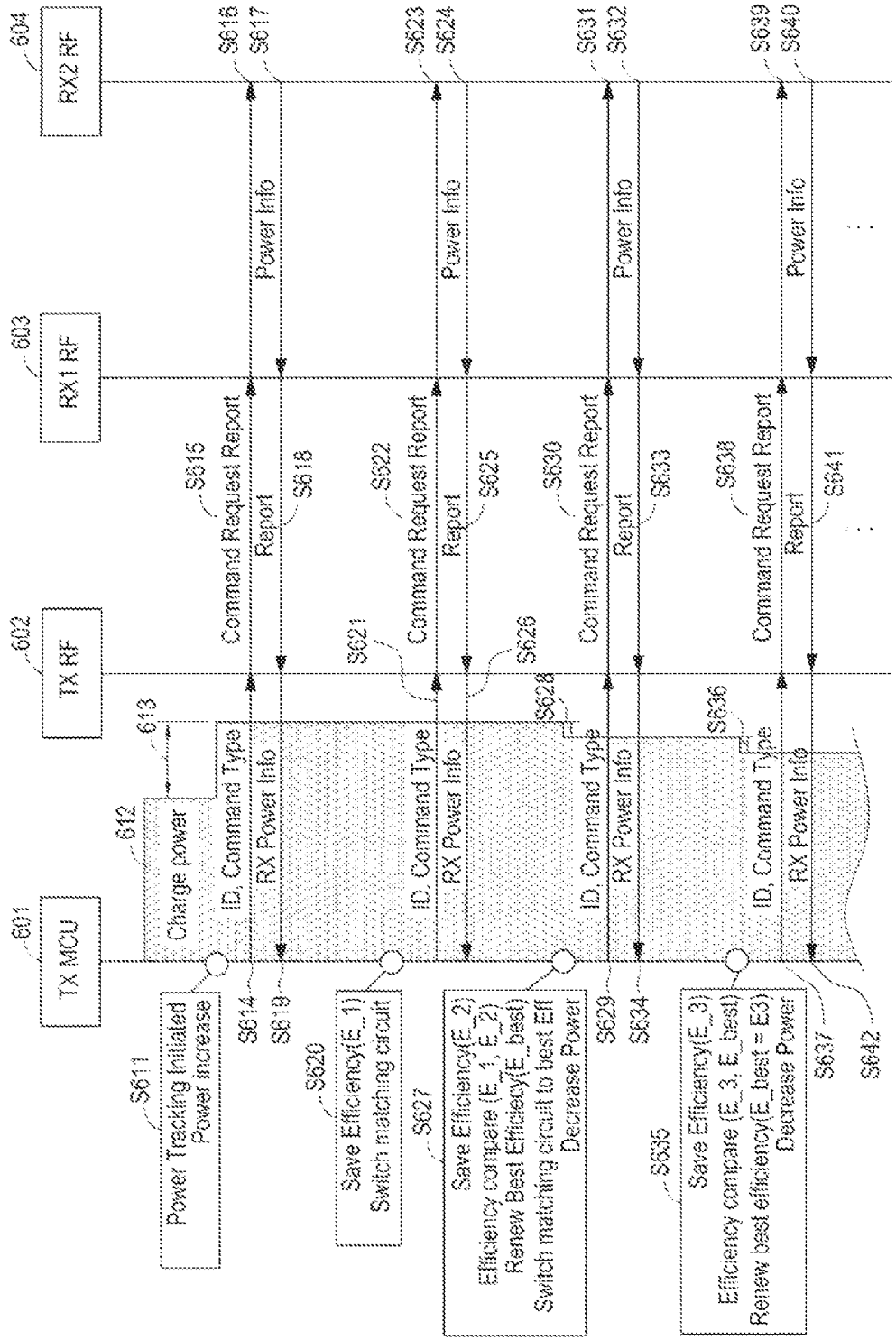
FIGS. 6A and 6B are timing diagrams illustrating signal transmission and reception and changes of applied voltage according to an embodiment of the present invention.
Figure 6B:
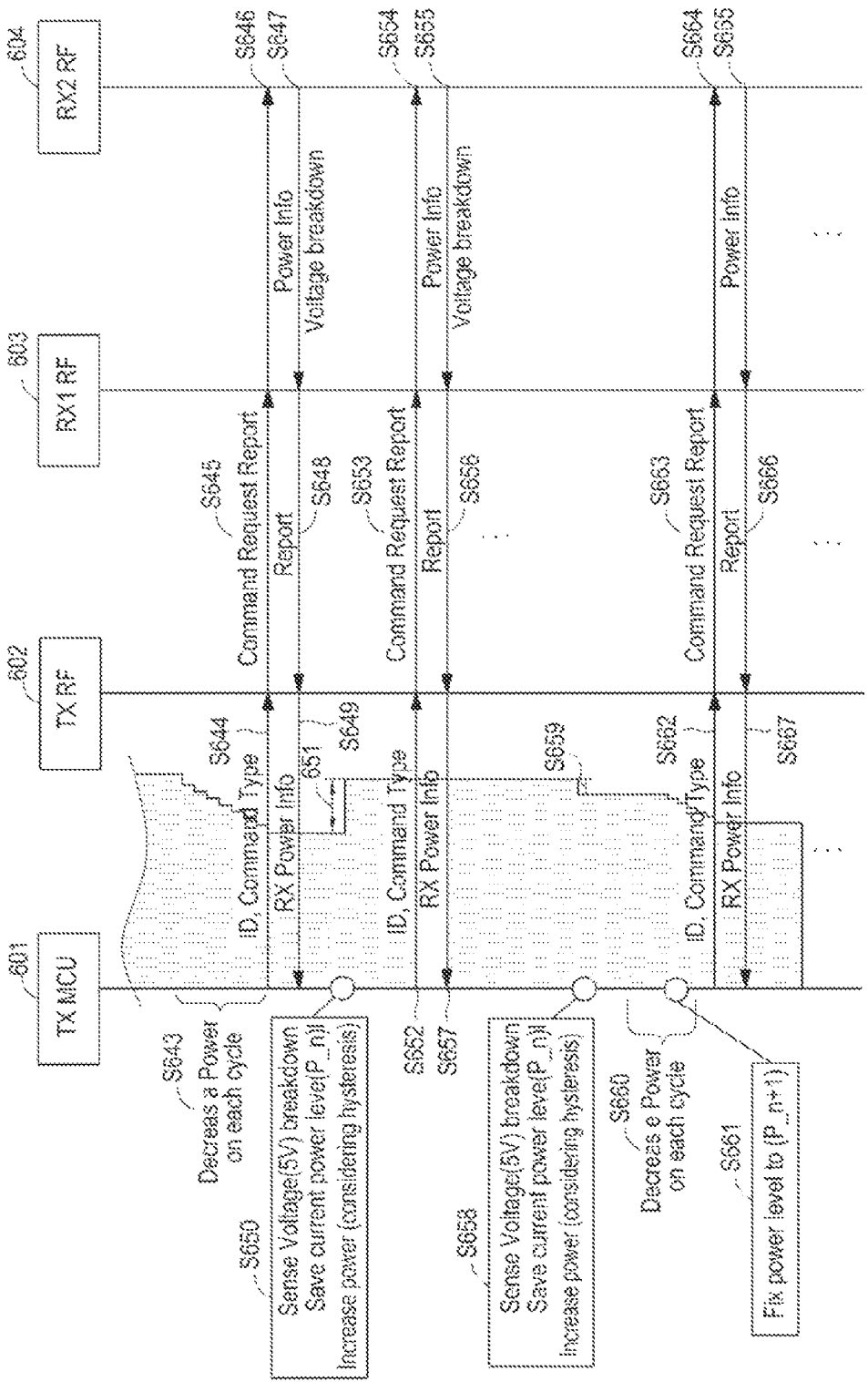

FIGS. 6A and 6B are timing diagrams illustrating signal transmission and reception and changes of applied voltage according to an embodiment of the present invention.

In the embodiment of the present invention according to FIG. 6A, it is assumed that the wireless power transmitter transmits power to the wireless power receiver. It is also assumed that the wireless power transmission shows an efficiency drop on the way, causing the wireless power transmitter to perform the power tracking.

Referring to FIGS. 6A and 6B, a controller 601 of the wireless power transmitter transmits charging power 612. When a triggering event of the power tracking occurs, the controller 601 initiates the power tracking, in step S611, accordingly increasing the applied power, in step S613.

The controller 601 generates a command signal to instruct the wireless power receiver to report session ID information and power information of the wireless power receiver, in step S614, and controls the communication unit 602 to transmit the command signal to the communication unit 603 of the wireless power receiver, in step S615. The command signal may have a data structure according to Table 4 below.

TABLE 4

| Frame Type | Session ID | Sequence number | Network ID | command Type | Variable |
|---|---|---|---|---|---|
| Command | 4 bit | 1 Byte | 1 Byte | 4 bit | 4 bit |

The frame type field indicates a type of the signal (i.e., the Command signal). The session ID field indicates an identifier of a session assigned by the wireless power transmitter to each wireless power receiver for the wireless power transmitter to control the wireless power network. The session ID field may be assigned 4 bits, for example. The sequence number field, which indicates a sequential order of the corresponding signal, may be assigned 1 byte, for example. For example, the sequence number may be incremented by 1 for each signal transmission or reception. The network ID field, which indicates a network identifier of the wireless power transmitter, may be assigned 1 byte, for example. The command type field, which indicates a type of the command, may be assigned 4 bits, for example. The variable field, which is an extra command type field, may be assigned 4 bits, for example. The command type and variable fields may be implemented in various embodiments, as shown in Table 5.

TABLE 5

| command Type | Variable |
|---|---|
| Charge start | reserved |
| Charge finish | reserved |
| Request Report | CTL level |
| Reset | Reset type |
| Channel Scan | Reserved |
| change channel | channel |

The charge start command initiates charging of the wireless power receiver. The charge finish command stops charging of the wireless power receiver. The Request report command is used by the wireless power receiver to transmit a report signal. The Reset command is an initialization command. The Channel scan command is used to scan channels. The channel change command is used to change a communication channel.

The command signal created in step S614 may be a Request report command.

The controller 604 of the wireless power receiver analyzes an input command signal and measures a current power condition. For example, the controller 604 measures a voltage and a current at the input and output ends of the DC to DC converter of the wireless power receiver. The controller 604 generates the report signal based on the measured power information, in step S617. The report signal may have a data structure according to Table 6 below.

TABLE 6

| Frame Type | Session ID | Sequence number | Network ID | Input Voltage | Output Voltage | Output Current | Reserved |
|---|---|---|---|---|---|---|---|
| Report | 4 bit | 1 Byte | 1 Byte | 1 Byte | 1 Byte | 1 Byte | 1 Byte |

The frame type indicates a type of the signal (i.e., the Report signal in Table 6). The session ID field indicates an identifier of a session assigned by the wireless power transmitter to the wireless power receiver for the wireless power transmitter to control the wireless power network. The session ID field may be assigned 4 bits, for example. The sequence number field, which indicates a sequential order of the corresponding signal, may be assigned 1 byte, for example. For example, the sequence number may be incremented by 1 for each signal transmission or reception. The network ID field, which indicatives a network identifier of the wireless power transmitter, may be assigned 1 byte, for example. The Input Voltage field, which indicates a voltage applied at the input end of the DC to DC inverter (not shown) of the wireless power receiver, may be assigned 1 byte, for example. The Output Voltage field, which indicates a voltage applied at the output end of the DC to DC inverter of the wireless power receiver, may be assigned 1 byte, for example. The Output Current field, which indicates a current passing through the output end of the DC to DC inverter of the wireless power receiver, may be assigned 1 byte, for example.

The communication unit 603 of the wireless power receiver transmits the generated report signal to the communication unit 602 of the wireless power transmitter, in step S618.

The wireless power transmitter transmits the command signal until receiving the Report signal or ACK from the wireless power receiver. When the wireless power transmitter fails to receive the Report signal or Ack from a particular wireless power receiver within a predetermined period of time, the wireless power transmitter may retransmit the command signal to the wireless power receiver for an additional period of time.

The controller 601 of the wireless power transmitter analyzes the received Report signal and catches the power information of the wireless power receiver, in step S620.

The wireless power transmitter calculates the wireless power transmission efficiency based on the power information of the wireless power receiver, and stores the calculation result (i.e., first wireless power transmission efficiency E_1). The controller 601 also controls a impedance matching unit (not shown) to optimize the wireless power transmission efficiency.

The controller 601 generates a command signal to instruct the wireless power receiver to report the session ID and the power information of the wireless power receiver, in step S621, and controls the communication unit 602 of the wireless power transmitter to transmit the generated command signal, in step S622.

The controller 604 of the wireless power receiver identifies the received command signal as an instruction to report the power information, in step S623. The controller 604 measures the power information and generates a report signal including the measured power information, in step S624. The communication unit 603 of the wireless power receiver transmits the generated report signal to the communication unit 602 of the wireless power transmitter, in step S625. The controller 601 of the wireless power transmitter analyzes the received Report signal and catches the power information of the wireless power receiver, in step S626. The controller 601 calculates second wireless power transmission efficiency E_2 based on the power information of the wireless power receiver.

The controller 601 compares the first wireless power transmission efficiency E_1 and the second wire power transmission efficiency E_2, in step S627. The controller 601 sets up a more efficient one of the first and second wireless power transmission efficiencies E_1 and E_2 as the optimal efficiency E_best based on the comparison. The wireless power transmitter controls the impedance matching unit to perform the impedance matching to maintain the optimal efficiency E_best. It also decrements the voltage of the power applied to the amplifier of the wireless power transmitter by 1 step, in step S628.

The controller 601 generates a command signal to instruct the wireless power receiver to report the session ID and the power information of the wireless power receiver, in step S629, and controls the communication unit 602 of the wireless power transmitter to transmit the generated command signal, in step S630.

The controller 604 of the wireless power receiver identifies the received command signal as an instruction to report the power information, in step S631. The controller 604 measures the power information and generates a report signal having the measured power information, in step S632. The communication unit 603 of the wireless power receiver transmits the generated report signal to the communication unit 602 of the wireless power transmitter, in step S633. The controller 601 of the wireless power transmitter analyzes the received Report signal and catches the power information of the wireless power receiver, in step S634. The controller 601 calculates third wireless power transmission efficiency E_3 based on the power information of the wireless power receiver.

The controller 601 compares the optimal transmission efficiency E_best and the third wire power transmission efficiency E_3, in step S636. The controller 601 reestablishes a more efficient one of the best transmission efficiency E_best and the third wireless power transmission efficiency E_3 as the optimal efficiency E_best based on the comparison, in step S635. The wireless power transmitter controls the impedance matching unit to perform the impedance matching to maintain the optimal efficiency E_best. The wireless power transmitter also decrements the voltage of the power applied to the amplifier of the wireless power transmitter by 1 step, in step S636.

The controller 601 generates a command signal to instruct the wireless power receiver to report the session ID and the power information of the wireless power receiver, in step S637, and controls the communication unit 602 of the wireless power transmitter to transmit the generated command signal, in step S638.

The controller 604 of the wireless power receiver identifies the received command signal as an instruction to report the power information, in step S639. The controller 604 measures the power information and generates a report signal having the measured power information, in step S640. The communication unit 603 of the wireless power receiver transmits the generated report signal to the communication unit 602 of the wireless power transmitter, in step S641. The controller 601 of the wireless power transmitter analyzes the received Report signal and catches the power information of the wireless power receiver, in step S642. The controller 601 calculates a fourth wireless power transmission efficiency E_4 based on the power information of the wireless power receiver, and may reestablish a new optimal wireless power transmission efficiency E_best by comparing the fourth wireless power transmission efficiency E_4 with the current optimal wireless power transmission efficiency E_best. The controller 601 decrements the voltage of the power applied to the amplifier by 1 step for each predetermined cycle (superframe cycle), in step S643, by repeating the foregoing procedure. The predetermined cycle may be a cycle (superframe cycle) during which the communication unit 602 of the wireless power transmitter transmits the Notice signal.

The controller 601 generates a command signal to instruct the wireless power receiver to report the session ID and the power information of the wireless power receiver, in step S644, and controls the communication unit 602 of the wireless power transmitter to transmit the generated command signal, in step S645.

The controller 604 of the wireless power receiver identifies the received command signal as an instruction to report the power information, in step S646. The controller 604 measures the power information and generates a report signal having the measured power information, in step S647. The Report signal generated in step S648 includes information of a voltage less than a predetermined threshold (e.g., 5V) at the output end of the DC to DC converter of the wireless power receiver. The communication unit 603 of the wireless power receiver transmits the generated report signal to the communication unit 602 of the wireless power transmitter, in step S648. The controller 601 of the wireless power transmitter analyzes the received Report signal and receives the power information of the wireless power receiver, in step S649. The controller 601 receives the voltage at the output end of the DC to DC converter of the wireless power receiver less than the predetermined threshold, stores a current power level, and stops the power tracking. In addition, the controller 601 increments the voltage of the power applied to the amplifier (by 2 steps, for example) by taking into account the hysteresis, which is represented by 651. The 2-step increments of the present example are not exclusively used herein, and the controller 601 may increase the voltage of the power 651 to maintain the power to be higher than the finally required power 688.

The controller 601 generates a command signal to instruct the wireless power receiver to report the session ID and the power information of the wireless power receiver, in step S652, and controls the communication unit 602 of the wireless power transmitter to transmit the generated command signal, in step S653.

The controller 604 of the wireless power receiver identifies the received command signal as an instruction to report the power information, in step S654. The controller 604 measures the power information and generates a report signal having the measured power information, in step S655. The Report signal generated in step S655 includes information indicating a voltage less than the predetermined threshold (e.g., 5V) at the output end of the DC to DC converter of the wireless power receiver. The communication unit 603 of the wireless power receiver transmits the generated report signal to the communication unit 602 of the wireless power transmitter, in step S656. The controller 601 of the wireless power transmitter analyzes the received Report signal and catches the power information of the wireless power receiver, in step S657. The controller 601 receives the voltage at the output end of the DC to DC converter of the wireless power receiver that is less than the predetermined threshold, and accordingly decrements the power by 1 step 660, in step S658.

The controller 601 decreases the voltage at the output end of the DC to DC converter of the wireless power receiver step by step, in step S660, by repeating the foregoing procedure. The controller 601 fixes the applied power when the voltage at the output end of the DC to DC converter of the wireless power receiver is equal to or greater than a predetermined threshold, in step S661.

The controller 601 generates a command signal to instruct the wireless power receiver to report the session ID and the power information of the wireless power receiver, in step S662, and controls the communication unit 602 of the wireless power transmitter to transmit the generated command signal, in step S663.

The controller 604 of the wireless power receiver identifies the received command signal as an instruction to report the power information, in step S664. The controller 604 measures the power information and generates a report signal having the measured power information, in step S665. The Report signal generated in step S655 includes information indicating a voltage equal to or greater than the predetermined threshold (e.g., 5V) at the output end of the DC to DC converter of the wireless power receiver. The communication unit 603 of the wireless power receiver transmits the generated report signal to the communication unit 602 of the wireless power transmitter, in step S666. The controller 601 of the wireless power transmitter analyzes the received Report signal and catches the power information of the wireless power receiver, in step S667. The controller 601 receives the voltage at the output end of the DC to DC converter of the wireless power receiver at least equal to the predetermined threshold, and accordingly fixes the applied power 668, in step S662.

Figure 7A:
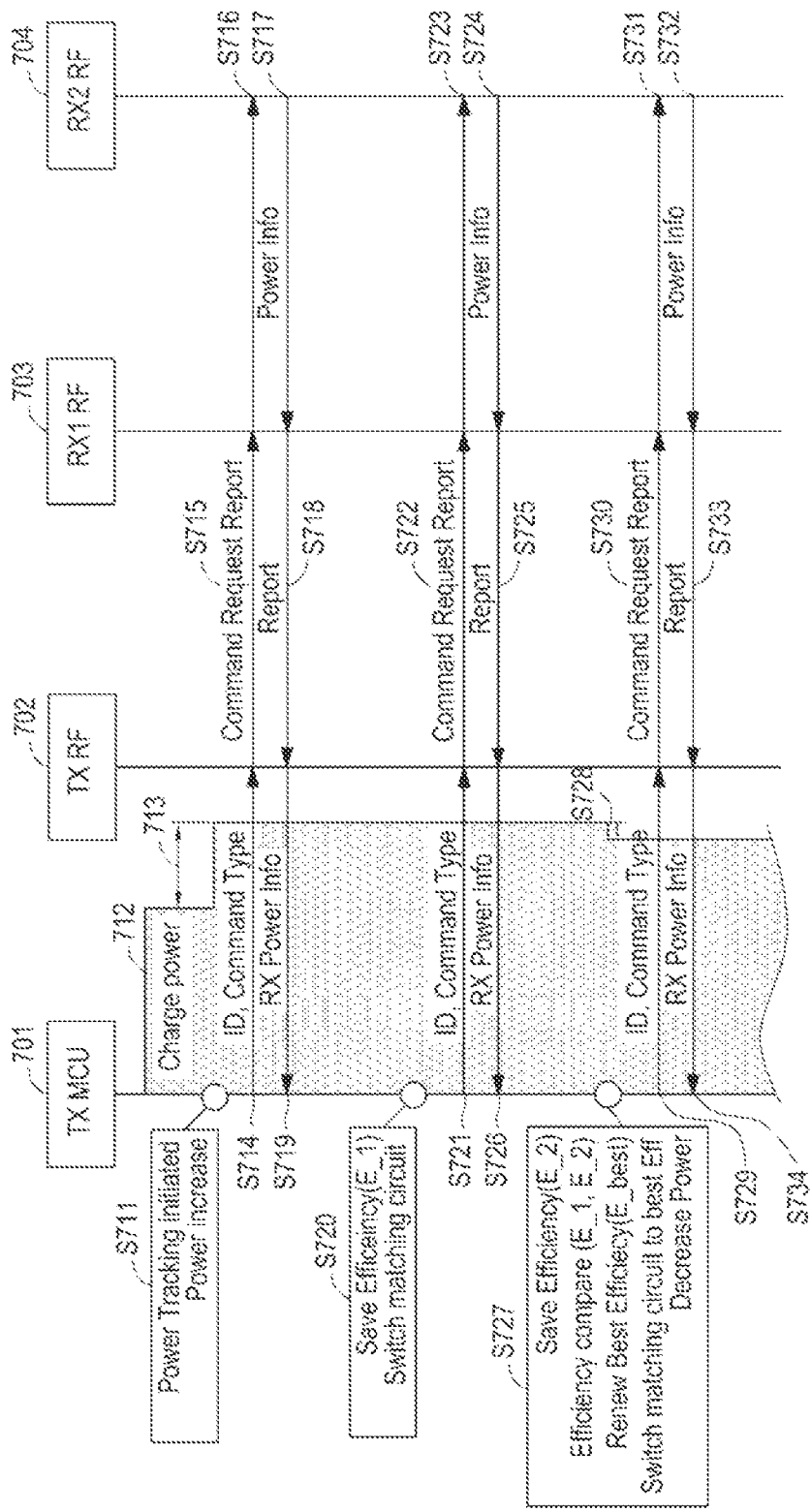
FIGS. 7A and 7B are timing diagrams illustrating signal transmission and reception and changes of applied voltage, according to another embodiment of the present invention.
Figure 7B:
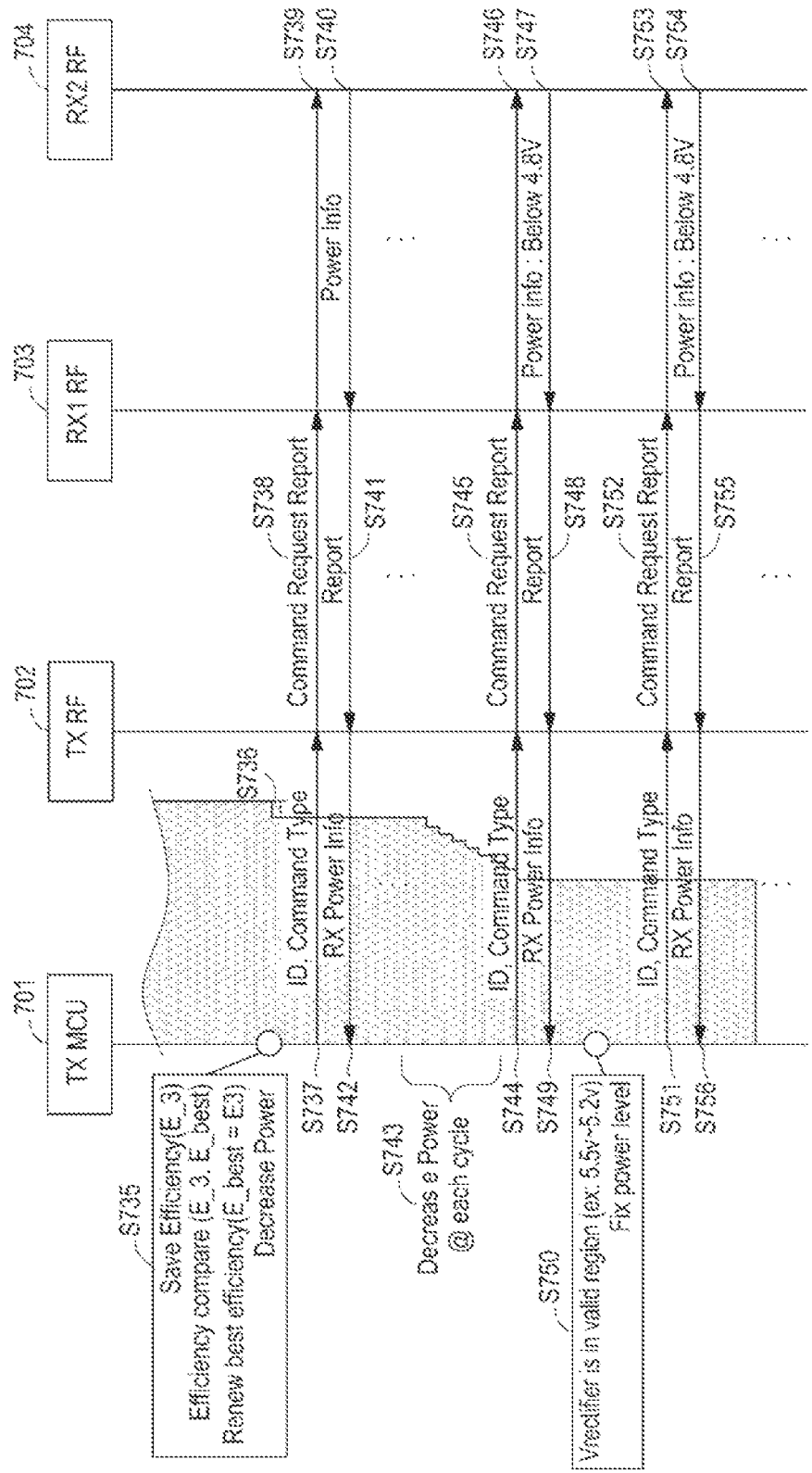

FIGS. 7A and 7B are timing diagrams illustrating signal transmission and reception and changes of the applied voltage, according to another embodiment of the present invention. Transmission and reception of various signals of FIG. 7A is performed in a manner similar to that of FIG. 6A, except that in FIGS. 7A and 7B, a controller 701 of the wireless power transmitter determines, from the received Report signal, whether the voltage at the input end of the DC to DC converter of the wireless power receiver is less than a predetermined threshold, in step S750. The predetermined threshold for voltage at the input end of the DC to DC converter may be 5.2V to 5.5V, for example, which is higher than the predetermined threshold, e.g., 5V for voltage at the output end of the DC to DC converter.

Figure 8:
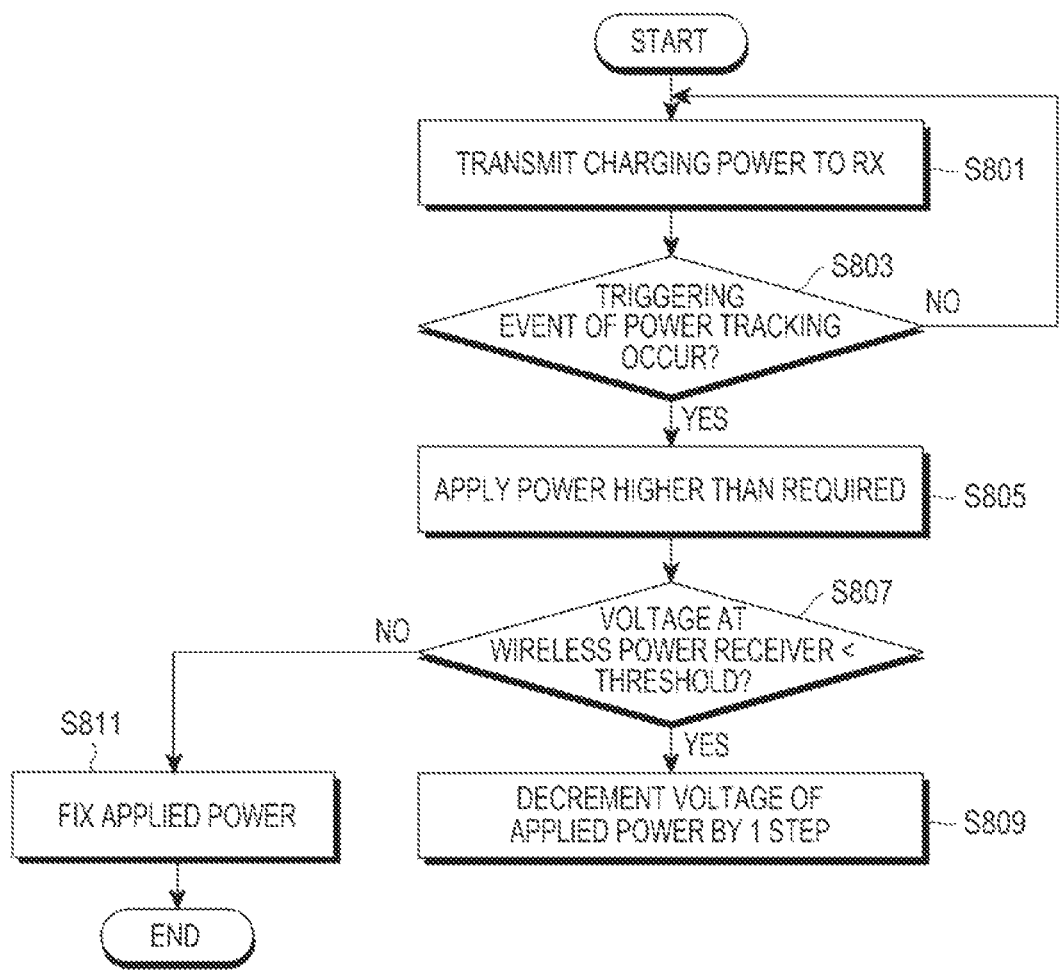
FIG. 8 is a flowchart illustrating a method of controlling the wireless power transmitter according to an embodiment of the present invention.

FIG. 8 is a flowchart illustrating a method of controlling the wireless power transmitter according to an embodiment of the present invention.

Referring to FIG. 8, the wireless power transmitter transmits the charging power to the wireless power receiver, in step S801. The wireless power transmitter determines whether a triggering event of the power tracking occurs, in step S803. As discussed above, the wireless power transmitter may determine that the triggering event of the power tracking occurs in at least one of the following cases:

i) when a new device, to which the wireless power transmitter transmits the command signal to start charging, is registered and ready to be charged, ii) when a wireless power receiver is rearranged or withdrawn, thus the load change is detected;

iii) when the wireless transmission efficiency is less than a predetermined threshold value; or iv) when the voltage at the input end or output end of the DC to DC converter of the wireless power receiver is less than a predetermined threshold value.

When a triggering event corresponding to the power tracking occurs in step S803, the wireless power transmitter may apply a power greater than the finally required power, in step S805. The wireless power transmitter may determine whether a voltage at the input end or output end of the DC to DC converter of the wireless power receiver is less than a threshold, in step S807.

Upon determining that the voltage at the input end or output end of the DC to DC converter of the wireless power receiver is less than the threshold, in step S807, the wireless power transmitter decrements the voltage of the applied power by 1 step, in step S809. Otherwise, upon determining that the voltage at the input end or output end of the DC to DC converter of the wireless power receiver is at least equal to the threshold, in step S807, the wireless power transmitter fixes the applied power, in step S811.

According to various embodiments of the present invention, the wireless power receiver selects a wireless power transmitter from which to receive wireless power. Selection of a wireless power transmitter improves communication quality, and enable efficient selection of when to start charging in the wireless power receiver. Furthermore, according to embodiments of the present invention, waste of power can be avoided by adjusting the amount of power required at respective phases.

Several embodiments have been described in connection with e.g., mobile communication terminals, but it will be understood that various modifications can be made without departing the scope of the present invention. While the invention has been shown and described with reference to certain embodiments thereof, it will be understood by those skilled in the art that various changes in form and details may be made therein without departing from the spirit and scope of the invention as defined by the appended claims.

What is claimed is:

1. A method of controlling wireless transmission to a wireless power receiver in a wireless power transmitter, the method comprising:
    transmitting charging power to the wireless power receiver by applying the charging power to a resonator of the wireless power transmitter;
    receiving power information of the wireless power receiver from the wireless power receiver;
    determining whether to adjust the charging power based on the power information of the wireless power receiver; and
    adjusting, upon determining whether to adjust the charging power, a size of the charging power applied to the resonator.

2. The method of claim 1, wherein adjusting the charging power comprises:
    increasing the charging power to a first power;
    decrementing the first power step by step until a voltage at the wireless power receiver meets a predetermined threshold; and
    when the voltage at the wireless power receiver meets the predetermined threshold, fixing the charging power.

3. The method of claim 2, wherein the voltage at the wireless power receiver includes a voltage at an input end or an output end of a Direct Current (DC) to DC converter of the wireless power receiver.

4. The method of claim 3, wherein the predetermined threshold for the voltage at the input end of the DC to DC converter of the wireless power receiver ranges from 5.2V to 5.5V, and the predetermined threshold for the voltage at the output end of the DC to DC converter of the wireless power receiver is 5V.

5. The method of claim 3, further comprising:
transmitting a command signal to instruct the wireless power receiver to report the power information; and
receiving, from the wireless power receiver, a report signal including the power information of the wireless power receiver in response to the command signal.

6. The method of claim 5, wherein the command signal comprises at least one piece of information about a session IDentifier (ID) of the wireless power receiver, a sequence number, a network ID of the wireless power transmitter, a command type, and extra information of the command type.

7. The method of claim 6, wherein the command type indicates that the command signal is an instruction to report the power information of the wireless power receiver.

8. The method of claim 5, wherein the report signal includes at least one of a session IDentifier (ID) of the wireless power receiver, a sequence number, a network ID of the wireless power transmitter, the voltage at the input end of the DC to DC converter of the wireless power receiver, the voltage at the output end of the DC to DC converter of the wireless power receiver, and a current passing through the output end of the DC to DC converter of the wireless power receiver.

9. The method of claim 1, wherein determining whether to adjust the charging power comprises determining whether a new wireless power receiver is registered in the wireless power transmitter and the wireless power transmitter transmits a command signal to start charging to the new wireless power receiver.

10. The method of claim 1, wherein determining whether to adjust the charging power comprises determining whether the wireless power receiver is rearranged or withdrawn and a corresponding load change is detected by the wireless power transmitter.

11. The method of claim 1, wherein determining whether to adjust the charging power comprises determining whether the wireless power transmitter has a wireless power transmission efficiency with respect to the wireless power receiver that is less than a predetermined threshold.

12. The method of claim 1, wherein determining whether to adjust the charging power comprises determining whether a voltage at an input end or output end of a DC to DC converter of the wireless power receiver is less than a predetermined threshold.

13. The method of claim 2, wherein decrementing the first power step by step comprises maintaining an optimal wireless power transmission efficiency by performing impedance matching of the wireless power transmitter.

14. The method of claim 2, wherein decrementing the first power step by step comprises decreasing power applied to an amplifier of the wireless power transmitter.

15. The method of claim 1, further comprising:
transmitting, for each cycle, a notice signal to the wireless power receiver, the notice signal having at least one of information of a protocol version of the wireless power transmitter, a sequence number, a network IDentifier (ID), information about wireless power receivers reporting to the wireless power transmitter, and information about a number of managed wireless power receivers.

16. The method of claim 2, wherein decrementing the first power step by step comprises decrementing a voltage of the first power by a step for a predetermined period of time.

17. The method of claim 2, wherein a voltage of the first power is two steps higher than a voltage of the charging power.

18. A wireless power transmitter for wirelessly transmitting power to a wireless power receiver, the wireless power transmitter comprising:
a power transmitter for transmitting charging power to the wireless power receiver;
a communication unit for receiving power information of the wireless power receiver; and
a controller for determining whether to adjust a size of the charging power applied to the power transmitter based on the power information of the wireless power receiver, and adjusting, upon determining whether to adjust the size of the charging power, the charging power.

19. The wireless power transmitter of claim 18, wherein the controller increases the charging power to a first power upon determining to adjust the size of the charging power, decrements a voltage at the first power step by step until a voltage at the wireless power receiver meets a predetermined threshold, and when the voltage at the wireless power receiver meets the predetermined threshold, fixes the decreased charging power.

20. The wireless power transmitter of claim 19, wherein the voltage at the wireless power receiver comprises a voltage at an input end or an output end of a Direct Current (DC) to DC converter of the wireless power receiver.

21. The wireless power transmitter of claim 18, further comprising:
an impedance matching unit for maintaining an optimal wireless power transmission efficiency by performing impedance matching of the wireless power transmitter.

22. The wireless power transmitter of claim 21, wherein the impedance matching unit includes at least one of at least one switch, at least one coil, and at least one capacitor.

23. The wireless power transmitter of claim 18, further comprising:
a power supplier for supplying power; and
an amplifier for amplifying the power with a predetermined gain,
wherein the controller decreases the power applied to the amplifier.

24. The wireless power transmitter of claim 18, wherein the communication unit transmits, for each cycle, a notice signal to the wireless power receiver, the notice signal having at least one of information of a protocol version of the wireless power transmitter, a sequence number, a network IDentifier (ID), information about wireless power receivers reporting to the wireless power transmitter, and information about a number of managed wireless power receivers.

25. The wireless power transmitter of claim 19, wherein the controller decrements a voltage of the first power by a step for each of a predetermined period of time.

26. The wireless power transmitter of claim 19, wherein a voltage of the first power is two steps higher than a voltage of the charging power.

27. A method for applying wireless power for charging a wireless power receiver by a wireless power transmitter, the method comprising:

applying at least one detection power to a resonator of the wireless power transmitter;

detecting a change in impedance of the wireless power transmitter caused by a placement of the wireless power receiver during applying the at least one detection power;

applying driving power, in response to detecting the change;

registering the wireless power receiver in a wireless power network managed by the wireless power transmitter; and applying charging power for the wireless power receiver.

28. A wireless power transmitter for wirelessly transmitting power to a wireless power receiver, the wireless power transmitter comprising:

a resonator; and a controller configured to:

apply at least one detection power to a resonator of the wireless power transmitter;

detect a change in impedance of the wireless power transmitter caused by a placement of the wireless power receiver during applying the at least one detection power;

apply driving power, in response to detecting the change;

register the wireless power receiver in a wireless power network managed by the wireless power transmitter; and apply charging power for the wireless power receiver.

* * * * *